United States Patent [19]

Cooper et al.

[11] Patent Number: 4,541,119

[45] Date of Patent: Sep. 10, 1985

[54] PORTABLE BROADCAST BAND INFORMATION TRANSMITTING SYSTEM

[76] Inventors: John R. Cooper, 5935 S. Newberry; Richard G. Sawyer, 5930 S. Bonarden, both of Tempe, Ariz. 85283

[21] Appl. No.: 657,189

[22] Filed: Oct. 3, 1984

[51] Int. Cl.$^3$ .......................... H04B 1/00; H04B 1/03
[52] U.S. Cl. .......................................... 455/57; 455/18; 455/127; 455/128; 455/129; 340/905
[58] Field of Search ...................... 455/3, 6, 11, 18, 49, 455/51, 53, 54, 57, 66, 95, 127, 128, 120, 351, 129; 40/445, 901; 340/905; 381/78

[56] References Cited

U.S. PATENT DOCUMENTS

| | | |
|---|---|---|
| 1,810,264 | 6/1931 | Bonitz . |
| 2,047,440 | 7/1936 | Sloss . |
| 2,255,055 | 9/1941 | Halstead ............................. 340/905 |
| 2,259,316 | 10/1941 | Lyle . |
| 2,517,891 | 8/1950 | Laeser .................................. 455/51 |
| 3,131,351 | 4/1964 | Herzfeld et al. . |
| 3,550,106 | 12/1970 | Gehman ............................... 455/95 |
| 3,660,762 | 5/1972 | Smith .................................... 455/57 |
| 4,097,808 | 6/1978 | Parke . |
| 4,158,813 | 6/1979 | Ellis et al. ........................... 455/127 |
| 4,307,466 | 12/1981 | Goldschmidt ...................... 455/57 |
| 4,317,220 | 2/1982 | Martin ................................. 455/51 |
| 4,347,626 | 8/1982 | Wenzel ................................ 455/57 |

FOREIGN PATENT DOCUMENTS 1337289 8/1963 France .............................. 455/351

OTHER PUBLICATIONS

Radio Amateur's Handbook, 1966 Edition, pp. 94–95.
Operating Manual for "Radio Realty", Model 1650, 1982.
Brochure entitled "Radio Sign System; Now, Transmitting Your Own Message on the Radio can be Easy and Inexpensive".

*Primary Examiner*—Jin F. Ng
*Attorney, Agent, or Firm*—Cahill, Sutton & Thomas

[57] ABSTRACT

A portable advertising sign is positioned in proximity to a street and includes a message board. A low power transmitter is physically secured to the sign and generates a modulated RF output signal at a predetermined frequency within the broadcast band. An antenna colocated with the sign is coupled to the transmitter and radiates the transmitter output signal. A cassette tape player is positioned in a secure area physically spaced apart from the sign by a substantial distance and includes a colocated power supply for supplying a DC voltage. A cable conveys the audio output signal from the tape player and the DC voltage from the power supply to the transmitter. The sign message board displays the operating frequency of the transmitter to vehicles passing by the sign.

18 Claims, 10 Drawing Figures

U.S. Patent  Sep. 10, 1985  Sheet 1 of 3  4,541,119
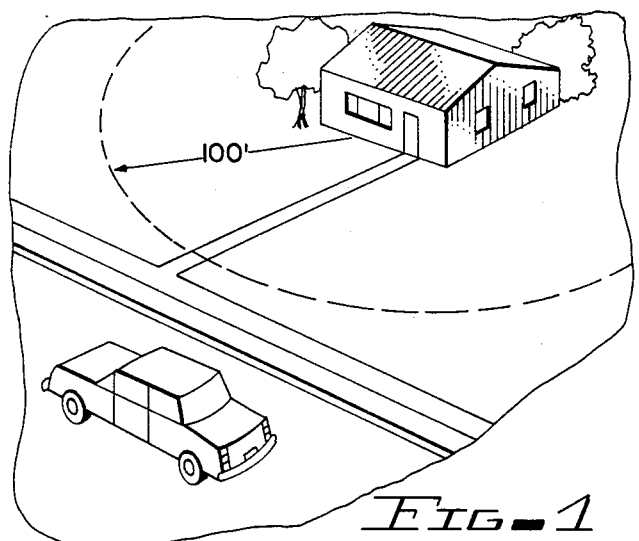
FIG-1 (PRIOR ART)
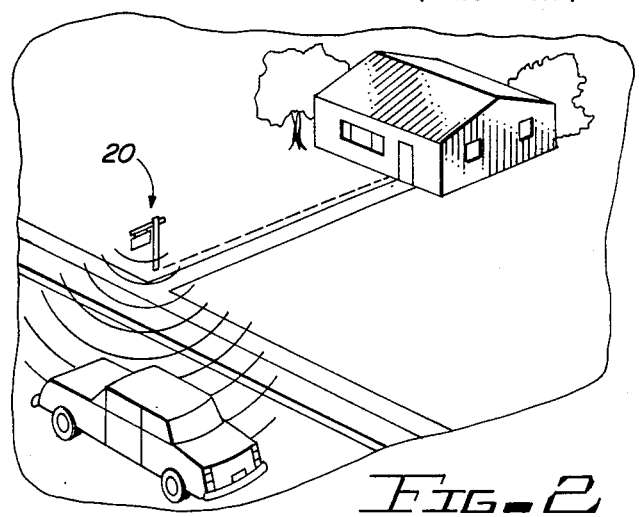
FIG-2
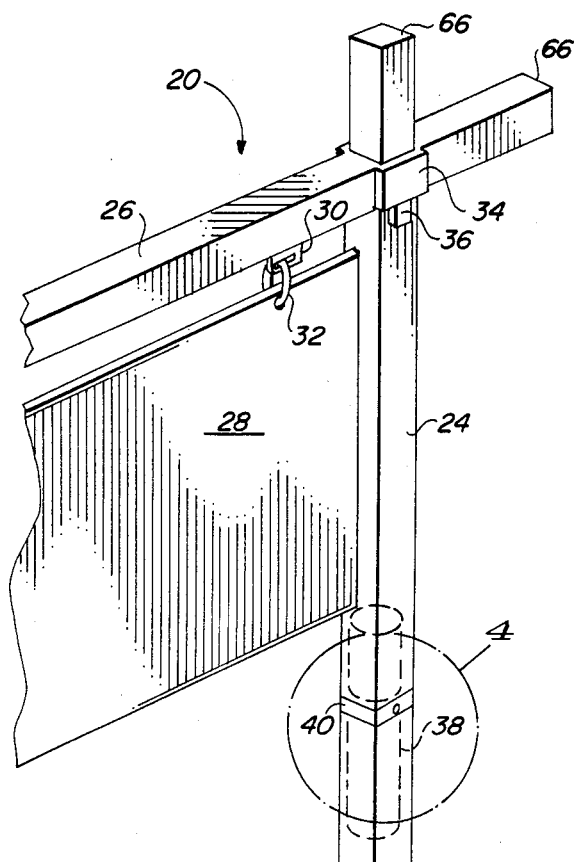
FIG-3
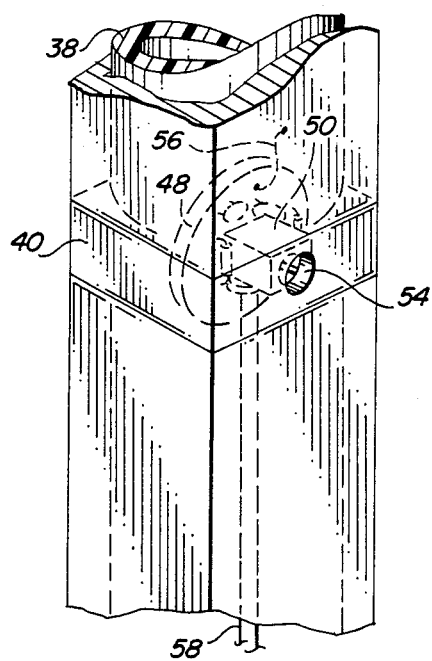
FIG-4
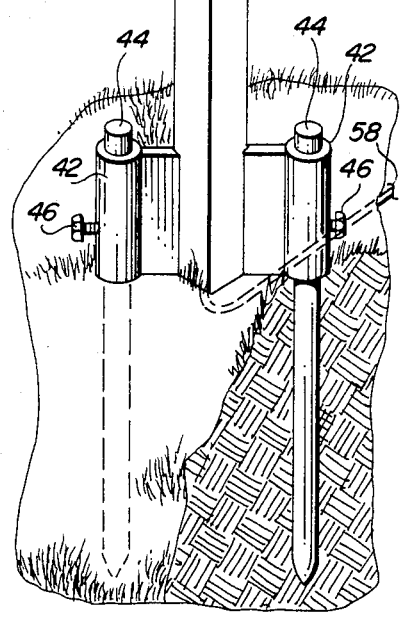

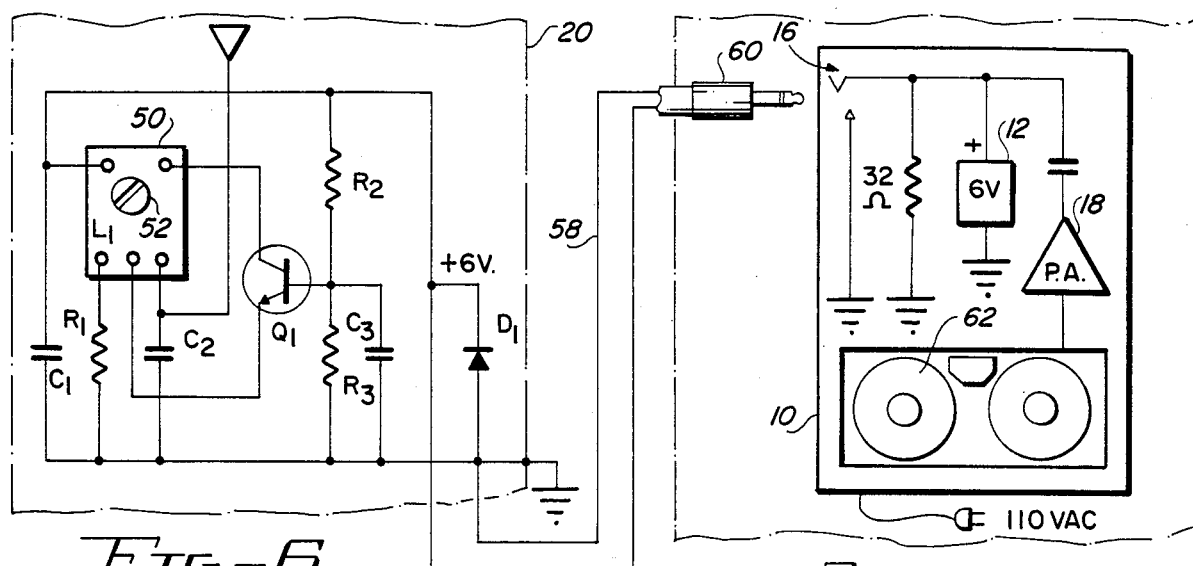
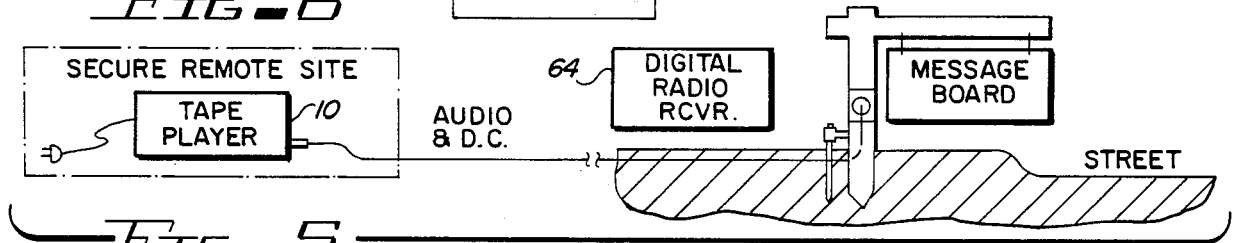
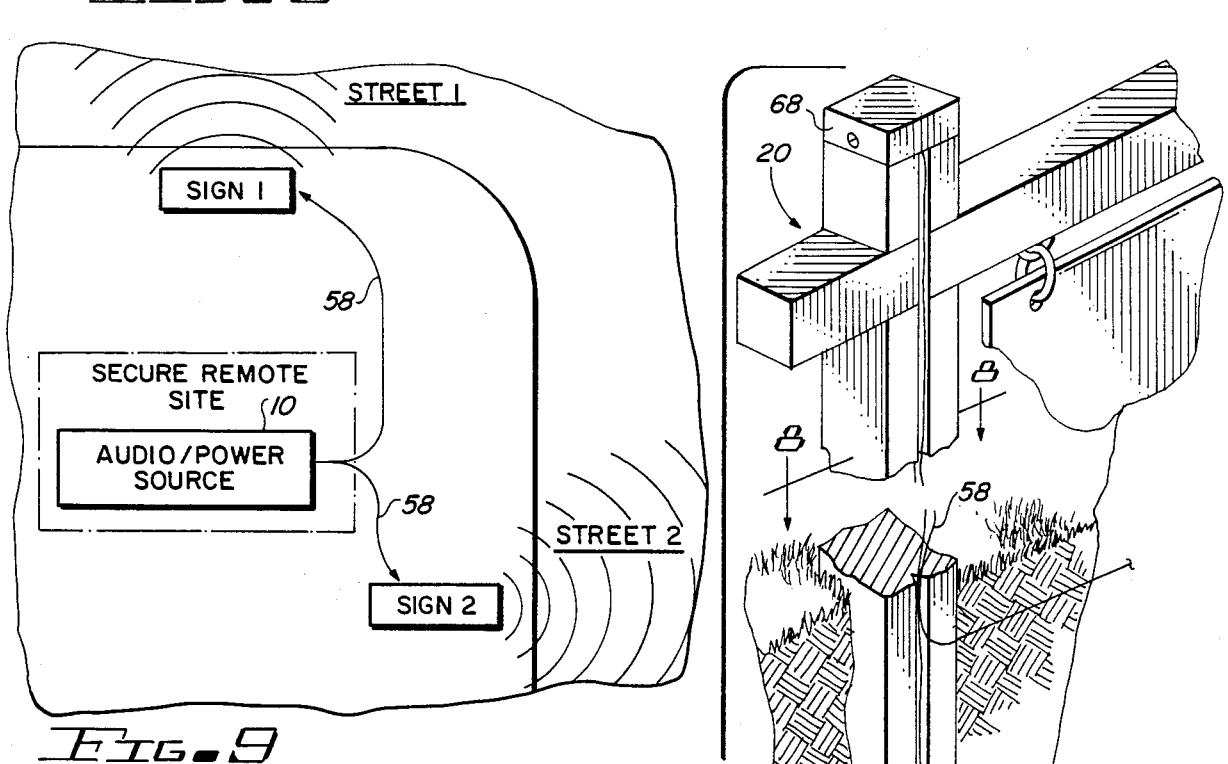
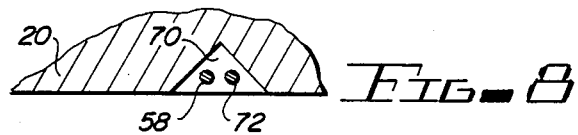

PORTABLE BROADCAST BAND INFORMATION TRANSMITTING SYSTEM

BACKGROUND OF THE INVENTION

1. Field of the Invention

This invention relates to a portable radio transmitter system for repetitively transmitting a message, and more particularly, to a portable broadcast band transmitting system for repetitively transmitting an advertising message to be received by a vehicle-mounted broadcast band receiver.

2. Description of the Prior Art

The Federal Communication Commission permits unlicensed operation within the AM broadcast band if transmitting input power is limited to 100 milliwatts and total antenna length including transmission lines does not exceed three meters.

In the past, unlicensed, low power AM transmitting systems have utilized an endless loop cassette tape player to continuously rebroadcast an advertising message to vehicle-mounted broadcast band receivers. In 1984, such devices were priced in the range of $300–$500.00. Because of the high per unit cost, these portable transmitter systems have been positioned within a locked dwelling to minimize loss by theft. Although advertising literature claims system ranges on the order of a thousand feet, such is not the case under normal operating conditions. Most vehicular AM radio receivers possess comparatively low sensitivity and are unable to clearly receive the signals broadcast by such unlicensed transmitting systems at distances in excess of approximately seventy-five to one hundred feet. Only very costly high sensitivity automotive radio receivers can achieve significantly increased operating ranges.

In many cases, the distance between the dwelling located transmitter and the street located vehicular receiver is sufficiently great to prevent reception of the message transmitted by existing systems. This problem cannot be solved by existing systems without violating the FCC power and antenna length restrictions.

Extraneous AM band noise emanating from sources such as vehicle ignition systems, street lights, power lines, electric motors and comparable sources in combination with the low signal strength created by a dwelling-located transmitter can prevent reception by vehicle broadcast band receivers.

In order to provide compatibility between existing portable message transmitting systems and radio receivers having ditigally synthesized tuners, such existing systems have incorporated an expensive digitally synthesized transmitter frequency control system. Such complex frequency synthesizer equipment contributes to the system complexity and high cost but has been considered necessary to ensure signal reception by the growing number of narrow bandwidth digitally tuned automotive receivers.

U.S. Pat. No. 3,131,351 (Herzfeld) discloses an outdoor theater sound system using a plurality of restricted range, series connected AM transmitters. At Column 3, line 30 through Column 4, line 2, Herzfeld discloses various methods of providing a source of power to each series coupled RF oscillators. At Column 4, lines 14-37, Herzfeld teaches his intent to restrict the operating range of his transmitters to ten to twelve feet. A flexible metal ground rod 30 is provided to contact and ground each vehicle to improve the signal reception quality in view of the extraordinarily low transmitter signal strength.

U.S. Pat. No. 2,259,316 (Lowe) discloses a low power fixed location broadcast band transmitting system for transmitting a repeating message to vehicles in the vicinity of the system antenna towers. As disclosed by Lowe, the power source, audio source and transmitter are located within a single building and are coupled by a lengthy transmission line to a massive, non-portable antenna system.

U.S. Pat. No. 4,097,808 (Parke) discloses a low power AM transmitter utilizing a single strand antenna which extends over a substantial distance beside a highway.

U.S. Pat. No. 1,810,264 (Bonitz) discloses an AM receiver which is mounted within a sign. This device receives a signal broadcast from a remote transmitter and radiaties an audio output signal through a loudspeaker to pedestrians passing the sign.

U.S. Pat. No. 2,047,440 (Sloss) discloses an AM radio receiver which is tuned to receive a signal transmitted from a remote site. A sign is displayed in connection with the radio receiver loudspeaker to communicate advertisements to passing pedestrians.

SUMMARY OF THE INVENTION

It is therefore a primary object of the present invention to provide a portable broadcast band message transmission system including a radio frequency oscillator physically secured to a sign displaying the system operating frequency where the system power source and audio modulation source is positioned in a remotely located secure area to thereby maximize the signal strength at a location adjacent to a street conveying vehicular traffic.

Another object of the present invention is to provide a portable broadcast band message transmission system having an inexpensive colocated sign/transmitter positioned adjacent to a street with the more costly audio source and power supply secured within a structure set back from the street.

Another object of the present invention is to provide a portable broadcast band message transmission system where the system transmitter and antenna form a part of an advertising sign positioned adjacent to a street.

Another object of the present invention is to provide a portable broadcast band message transmission system wherein a section of an advertising sign is fabricated from an electrically conductive material and serves as the antenna for a transmitter attached to the sign.

Another object of the present invention is to provide a portable broadcast band message transmission system wherein the field strength of the transmitted radio frequency signal at a vehicle-mounted receiver is maximized by placing a transmitter in a sign at a position adjacent to a street.

Another object of the present invention is to provide a portable broadcast band message transmission system including a sign which can readily be disassembled for transportation or storage and reassembled for installation.

Another object of the present invention is to provide a portable broadcast band message transmission system including a pair of laterally spaced apart stakes slideably secured to the bottom of a sign to facilitate quick installation and removal of the sign/transmitter component of the system.

Another object of the present invention is to provide a portable broadcast band message transmission system including a transmitter having a continuously variable but stable output frequency for enabling the transmitter to be tuned to a clear frequency capable of being received by an automotive radio having a digitally synthesized tuner.

Another object of the present invention is to provide a portable broadcast band message transmission system which can be tuned to a clear, 10 kH spaced operating frequency by utilizing a separate radio receiver having a digital frequency display.

Another object of the present invention is to provide a portable broadcast band message transmission system which transmits both an audio modulation signal and a DC voltage from a remotely positioned audio/power source to a spaced apart sign/transmitter unit via a single two-conductor cable.

Briefly stated, an in accord with one embodiment of the invention, a portable message transmitting system includes a portable sign positioned in proximity to a street. A low power transmitter is physically secured to the sign and generates a modulated RF output signal at a predetermined frequency within the broadcast band. An antenna having an effective length of less than or equal to three meters is coupled to the transmitter and secured to the sign for radiating the modulated RF output signal from the transmitter. A portable cassette player is positioned in a secure area physically spaced apart from the sign by a substantial distance. A power supply colocated with the tape player supplies a DC voltage. A cable is coupled at a first end to receive the audio output signal from the tape player and the DC voltage from the power supply and at a second end to the transmitter to thereby convey the aduio output signal and the DC voltage over the distance between the tape player and the transmitter. The sign includes a message board indicating the operating frequency of the transmitter to vehicular traffic.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIG. 1 illustrates the limited effective operation range of art message transmitting systems.

FIG. 2 illustrates the operating range improvement achieved by the present invention in comparison with the prior art illustrated in FIG. 1.

FIG. 3 is a partially cut-away perspective view of the sign/transmitter of the present invention.

FIG. 4 is a partially cutaway, enlarged perspective view of the central section of the sign depicted in FIG. 3, particularly illustrating the electrical isolating means which couples together the upper and lower sections of the sign and the RF oscillator.

FIG. 5 is a schematic diagram illustrating the basic component parts of the present invention and their relative position.

FIG. 6 is a schematic diagram of the RF oscillator of the present invention and a simplified diagram of the cassette tape player/power supply of the present invention.

FIG. 7 depicts a second preferred embodiment of the present invention utilizing a wooden sign including a top-mounted transmitter and an antenna system embedded in the side of the sign post.

FIG. 8 is a view of the embodiment depicted in FIG. 7, taken along section line 8—8, particularly depicting the recess in which the audio/power cable and antenna is positioned.

FIG. 9 depicts another embodiment of the present invention including two spaced apart signs coupled to operate in connection with a single remotely located audio/power source.

DESCRIPTION OF THE PREFERRED EMBODIMENT

Figure 10:
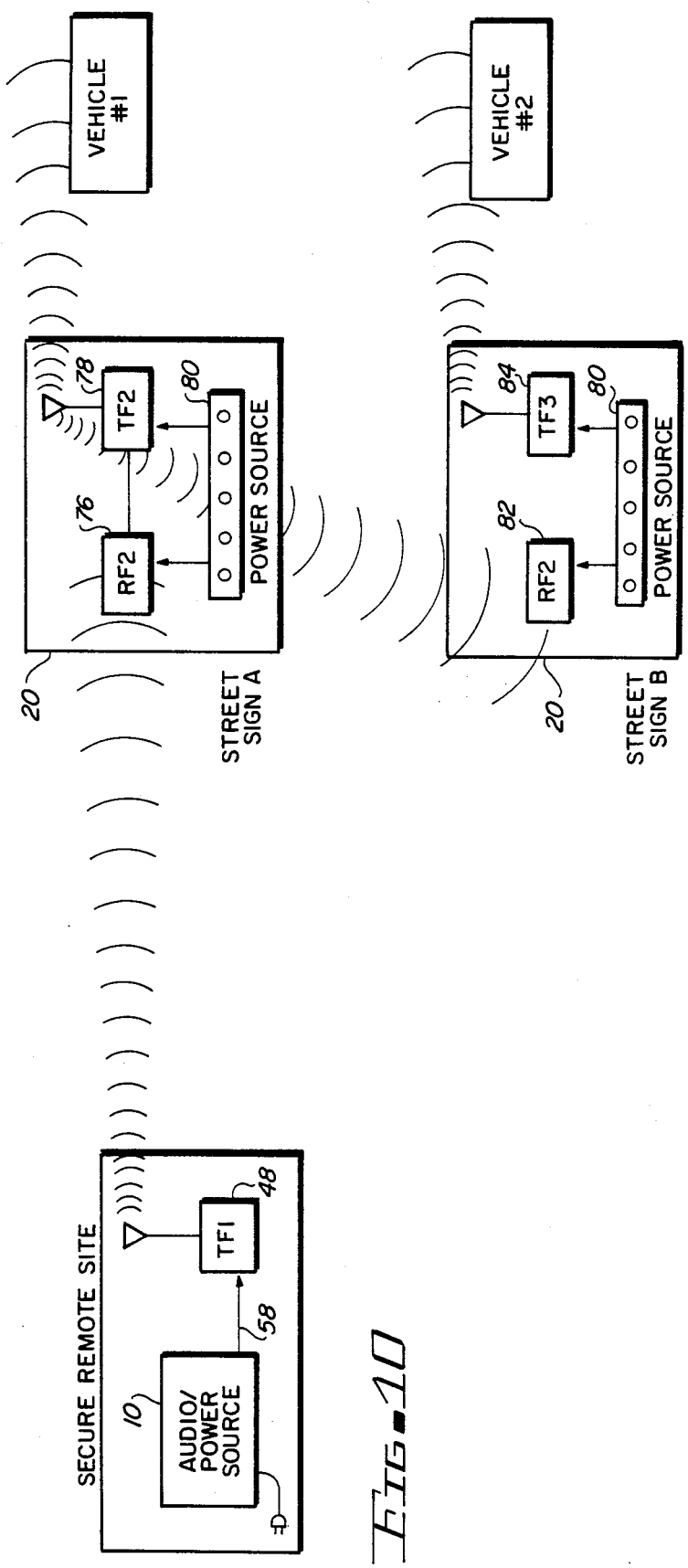
FIG. 10 depicts another preferred embodiment of the present invention which eliminates the cable interconnecting the audio/power supply unit and the sign and which includes a second sign transmitting on an additional frequency to extend the overall range of the system.

In order to better illustrate the advantages of the invention and its contributions to the art, a preferred hardware embodiment of the invention will now be described in detail.

Referring to FIGS. 2-6, a commercially available cassette tape player 10 with or without a recording function is coupled to a source of power such as a commercial AC power source. Tape player 10 may either include a built-in AC to DC power supply or may be purchased with an external AC/DC power supply adaptor which is connected to a power input jack on the tape player and provides a source of six volt DC power. In order to simplify the operation of the present invention and maximize its commercial appeal, tape player 10 is electrically modified as indicated in FIG. 6 such that the output of the six volt power supply indicated by reference number 12 is coupled to the ungrounded terminal of female jack 16. This modification does not interfere with the normal operation of tape player 10. The audio output signal from power amplifier 18 is coupled through a capacitor to jack 16. In virtually all commercially available cassette tape players, jack 16 is available in the form of an earphone output jack.

The second primary element of the present invention includes a portable advertising sign which is located adjacent to a street. In one embodiment of the present invention, sign 20 is fabricated from three separate tubular metal elements referred to as lower section 22, upper section 24 and cross member 26. A message board 28 is secured to cross member 26 by a pair of spaced apart brackets 20 and links 32.

Cross member 26 includes a rectangular aperture designated by reference number 34 which is dimensioned to fit tightly around the rectangular exterior of upper section 24. A pair of horizontally opposed stops 36 extend laterally outward from the vertically oriented side surfaces of upper section 24 and maintain cross member 26 in a fixed vertical position with respect to design 20. The tight mechanical fit between rectangular aperture 34 of cross member 25 and the exterior surface of upper section 24 ensures a mechanically rigid connection with these two elements and forms an electrically conductive path therebetween.

Lower section 22 is mechanically secured to upper section 24 by electrical isolating means in the form of a plastic insert 38. Insert 38 can be most economically fabricated from a length of PVC pipe having an outer diameter compatible with the inner dimension of sections 22 and 24 of sign 20. A larger diamter plastic shoulder 40 having either a round or rectangular cross section is adhesively secured to insert 38 at its midpoint to maintain upper section 24 physically spaced apart from and electrically insulated from lower section 22.

A pair of horizontally opposed brackets 42 having vertically oriented tubular openings are dimensioned to receive metal stakes 44. The side surface of each bracket 42 includes a threaded aperture for receiving a bolt 46 which clamps each stake 44 at an appropriate vertical position. During installation, bolts 46 are loosened and stakes 44 are extended upward such that their lower surface is positioned at the bottom of or within brackets 42. In this configuration, the lower end of sign section 22 is positioned at the appropriate location on the ground and a hammer is used to drive stakes 44 into the ground until the upper surface of each stake is approximately level with the upper surface of each bracket 42. Bolts 46 are then tightened to clamp brackets 42 to stakes 44. This unique feature of the present invention provides a sign which can be readily installed or removed by using only a hammer and a wrench and eliminates the requirement for digging a hole in the ground to receive a large diameter sign post.

A single transistor Hartley oscillator serves as the transmitter 48 for the present invention. FIG. 4 best illustrates that transmitter 48 is physically secured to plastic insert 38 at its mid-position. A commercially available temperature compensated, slug-tuned inductor 50 controls the transmitter operating frequency. The tuning slug of inductor 50 is positioned in alignment with an aperture 54 to set the operating frequency of transmitter 48 during installation.

FIG. 6 depicts an electrical schematic diagram of the components comprising transmitter 48. The table below indicates the specifications and values of the components used in transmitter 48. A short length of wire designated by reference number 56 couples the RF output of transmitter 58 taken between capacitor $C_2$ and inductor 50 to the electrically conductive upper section 24 of sign 20 which functions as the transmitter antenna.

| TABLE OF COMPONENT SPECIFICATIONS | | |
|---|---|---|
| $L_1$ | 42If 300 | Osc Coil |
| $Q_1$ | 2N4401 | Transistor |
| $Q_2$ | 1N4001 | Diode |
| $R_1$ | 1.5 k ohm | Resistor ⅛ watt |
| $R_2$ | 2.2 k ohm | Resistor ⅛ watt |
| $R_3$ | 100 ohm | Resistor ⅛ watt |
| $C_1$ | 82 pF | Capacitor ceramic |
| $C_2$ | .01 pF | Capacitor ceramic |
| $C_3$ | .1 pF | Capacitor ceramic |

In the unlicensed 100 mW version of the present invention, current FCC regulations limit the length of the antenna and any transmission line to three meters. For a sign of normal dimension, links 32 will normally either be fabricated from an electrically insulating material such as plastic or will include an electrically insulating covering to prevent an electrically conductive sign board 28 from functioning as an extension of the transmitter antenna and possibly violating FCC regulations. For a sign 20 of comparatively small physical size, links 32 and message board 28 may be fabricated from electrically conductive materials to cause message board 28 to increase the effective antenna length to meet the FCC regulation.

In a typical residential real estate installation, tape player 10 is positioned in a secure location such as the interior of a dwelling to prevent theft of this comparatively expensive (approximately $20–$30) element of the present invention. Additional security precautions for the transmitter/sign element of the present invention are typically unnecessary for two reasons. First, no externally perceptable feature of sign 20 reveals that a transmitter 48 is present within the sign or that the sign differs in any significant way from standard real estate advertising signs of the type encountered by the public on a daily basis. Second, the total cost of transmitter 48, including its printed circuit board, electrical components and assembly expenses, runs between one to three dollars.

A two-conductor cable 58 couples the comparatively expensive tape player 10 to the essentially invisible, low cost transmitter 48. The first end of cable 58 may include a two-conductor male plug 60 to facilitate installation and disassembly of the portable system of the present invention. The second end of cable 58 may be configured with a male plug/female jack assembly if desired. The overall length of cable 58 is comparatively unimportant since it conveys only low current DC power and a low power audio signal. Cable lengths in excess of 100 feet should not cause system problems and would not violate FCC regulations since the cable 58 does not form a part of the antenna system.

In some installations, cable 58 may be buried slightly below the surface of the earth as depicted in FIG. 5 to protect the cable from damage. A mechanized shallow trenching machine such as that used for commercial telephone line installations could be utilized to bury cable 58. In most installations, an above ground installation of cable 58 would be satisfactory, particularly if the color of the exterior cover of dable 58 blends with the terrain.

An endless loop cassette cartridge 62 is inserted in tape player 10 to provide a continuously repeating audio output signal which is converted into an RF output signal by transmitter 48/antenna 20. During installation of the present system at a particular business or residence, an appropriately tailored script is written out and recorded on cassette 62 by utilizing the built-in microphone/tape recording features of tape player 10 or another tape recorder. Sign 20 is erected at an appropriate location adjacent to a nearby street. Tape recorder 10 is installed in a secure area within a nearby building or dwelling and is coupled to a source of commercial AC power, a storage battery, or other adequate source of power. Cable 58 is routed from sign 20 into the dwelling and is inserted into jack 18 to convey DC power and the audio output signal to transmitter 48.

By using a separate radio receiver having a digital frequency output display as depicted by reference number 64 in FIG. 5, an installer can select an appropriate operating frequency for this system by tuning receiver 64 to a frequency centered on a clear 10 kHz operating channel. After having selected such a clear operating channel with receiver 64, the operator inserts a tuning tool into aperture 54 and rotates tuning slug 52 until the operating frequency of transmitter 48 is properly centered about the selected operating frequency as indicated by the reception volume on receiver 64 which is operating within earshot of sign 20.

Use of a radio 64 having a digital frequency read-out ensures that an increasingly large number of vehicles utilizing digitally synthesized frequencies are capable of receiving the transmissions of the present invention. If the operating frequency of transmitter 48 is not tuned to an operating frequency equal to an even multiple of 10 kH, digitally synthesized vehicle radios will not be able to receive transmissions from the present invention. If reception by such radios is not important to the system user, a conventional AM radio receiver without a digital operating frequency display may be used.

Upon completion of the tuning procedures described above, the system installer removes radio 64 and uses it for other system installations. Consumer radios with digital tuning indicators are commercially available from General Electric and other manufacturers at a cost of approximately fifty dollars.

Inductor 50 and the specific configuration of the circuit used for transmitter 48 were designed and tested to ensure essentially drift free, continuous transmitter operation regardless of extremely large temperature variations or humidity variations. A layer of adhesive tape or sealant is placed over the exterior opening of aperture 54 to thoroughly seal the interior of sign 20 from intrusion by rain, dust and the elements. A plastic cap insert 66 is attached to the exposed upper end of sign section 24 to seal the top of sign 20. Rectangular plastic caps 66 are secured to the two open end sections of cross member 26 for the same reasons. The configuration of plastic insert 38 and shoulder 40 further serve to shield transmitter 48 from contamination by rain water and dirt.

FIGS. 7 and 8 illustrate a second embodiment of the present invention wherein sign 20 is fabricated from wood. A housing 58 is coupled to the top of sign 20 or to another convenient location and serves to enclose and weatherproof transmitter 48. Cable 58 is routed through a V-shaped groove 70 in the side of sign 20 to conceal the presence of the transmitter system. A separate vertically oriented three meter or shorter antenna wire 72 is positioned in groove 70 and extends downward from housing 58 to a point just above the ground. A separate ground wire 74 may be provided as required.

FIG. 9 illustrates another embodiment of the present invention which incorporates a single tape player/power source 10 in combination with first and second spaced apart sign/transmitter units. The first sign is positioned adjacent to a first street while the second sign is positioned adjacent to a second street. A pair of cables 58 couple the DC plus audio output of tape player 10 to a separate transmitter located within each sign.

In the more elaborate embodiment of the present invention depicted in FIG. 10, the output of tape player 10 is coupled by a short cable to a first transmitter 48. Transmitter 48 may be either positioned within the secure remote site or in close proximity thereto and transmits a modulated RF output signal on a first frequency. A remotely positioned street sign designated by reference letter "A" includes a commercially available miniature radio receiver 76 which is tuned to receive the signal transmitted by transmitter 48. The modulated audio output signal from receiver 76 is coupled to transmitter 78 which broadcasts on a second frequency from sign 20 of a configuration substantially identical to that depicted in FIG. 3. A plurality of solar cells 80 or other source of DC power is provided to energize receiver 75 and transmitter 78. A second street sign 20 designated by reference letter "B" is spaced apart from street sign "A". This street sign includes a miniaturized radio receiver 82 tuned to receive the signal transmitted by transmitter 78. The output of receiver 82 is coupled to the input of transmitter of 84 which can broadcast on a frequency matched to the operating frequency of transmitter 78 or on a different frequency.

By utilizing a series of sign/transmitter systems of the type depicted in FIG. 10, the overall operating range of the present invention may be extended as desired.

Numerous different versions of the present invention utilizing somewhat different component configurations and different structural arrangements would be readily apparent to one of ordinary skill in the art and would not deviate from the scope of the present invention. Accordingly, it is intended by the appended claims to cover all such modifications of the invention which fall within the true spirit and scope of the invention.

We claim:

1. A portable system for transmitted information over a modulated RF output signal to a vehicle-mounted broadcast band receiver, comprising:
    a. A portable advertising sign positioned adjacent to a publicly accessible street and including a message board; said sign including electrically conductive upper and lower section physically interconnected by an electrical isolating means
    b. a tunable low power transmitter physically secured to said isolating means and concealed within a cavity in said sign for generating a modulated RF output signal at a predetermined frequency within the broadcast band, said transmitter including an RF output stage and continuously variable tuning means for repositioning the transmitter output frequency to a clear channel within the broadcast band;
    c. an above-ground antenna formed by said upper and lower sections of the portable advertising sign and having an effective length of less than or equal to three meters coupled directly to the RF output stage of said transmitter for radiating the modulated RF output signal from said transmitter;
    d. a portable cassette tape player positionable in a selectable secure area physcially spaced apart from said sign by a substantial distance exceeding fifteen feet, said tape player including an endless loop cassette for generating a repeating audio output signal;
    e. a power supply colocated with said tape player for converting AC power from a commercial source to a DC voltage suitable for energizing both said remotely located transmitter and said colocated tape player;
    f. a portable cable exceeding fifteen feet in length coupled at a first end to receive both the audio output signal from said tape player and the DC voltage from said power supply and at a second end to said transmitter for conveying both the DC voltage and audio output signal over the distance between said tape player and said transmitter;
    g. quick disconnect means for enabling the first end of said cable to be readily connected to and disconnected from said tape player; and
    h. said sign message board indicating the operating frequency of said transmitter.

2. The portable information transmitting system of claim 1 wherein actuation of said cassette tape player simultaneously transmits both the DC voltage and the audio output signal through said cable to said transmitter actuating said transmitter to radiate an RF signal modulated by the audio output signal.

3. The portable information transmitting system of claim 2 wherein said cable includes only first and second conductors for simultaneously conveying the audio signal and the DC voltage in a superimposed relationship from said tape player to said transmitter.

4. The portable information transmitting system of claim 3 wherein said tape player includes a two conductor output jack coupled to simultaneously receive both the DC voltage from said power supply and the audio output signal from said tape player and to convey said DC voltage and said audio output signal to said two-conductor cable.

5. The portable information transmitting system of claim 4 wherein the first end of said cable includes a two-conductor male plug for accommodating said output jack.

6. The portable information transmitting system of claim 5 wherein said output jack includes a normally closed jack which forms an open circuit upon insertion of said plug into said jack, whereby said tape player functions as a standard tape player directing an audio output signal to an enclosed loud speaker until said plug is inserted into said jack.

7. The portable information transmitting system of claim 1 wherein said sign further includes earth penetrating means for maintaining said sign in an erect position and for providing an electrical ground at the base of said sign for grounding said transmitter.

8. The portable information transmitting system of claim 7 wherein said earth penetrating means includes a metal spike electrically coupled to said transmitter.

9. The portable information transmitting system of claim 1 wherein said sign further includes an aperture for accessing said transmitter tuning means from a location exterior to said sign.

10. The portable information transmitting system of claim 9 wherein the tuning means includes a slug tuned inductor.

11. The portable information transmitting system of claim 1 wherein said power supply is at least partially enclosed within and forms a part of said tape player.

12. The portable information transmitting system of claim 1 further including a broadcast band receiver having a digital display for identifying a clear channel within the broadcast band, for precisely measuring the receiving frequency of said transmitter, and for enabling said transmitter to be tuned to a clear channel operating frequency compatible with the digitally synthesized, 10 kHz spaced receiving frequencies of a digitally tuned automotive receiver.

13. The portable information transmitting system of claim 1 wherein the lower section of said sign is electrically conductive and penetrates into the earth to function as an RF ground.

14. The portable information transmitting system of claim 13 wherein the lower section of said sign includes a ground rod for penetrating into the earth.

15. The portable information transmitting system of claim 1 wherein the upper section of said sign includes a vertical support member and a horizontal cross-arm.

16. The portable information transmitting system of claim 15 wherein said sign message board is coupled to said cross-arm.

17. The portable information transmitting system of claim 16 wherein said message board is fabricated from an electrically conductive material which forms a part of said antenna.

18. The portable information transmitting system of claim 1 wherein said sign is fabricated from tubular members.

* * * * *